(12) United States Patent
Schindler (10) Patent No.: US 11,237,123 B2
(45) Date of Patent: Feb. 1, 2022

(54) MEASURING ARRANGEMENT AND METHOD FOR A THERMAL ANALYSIS OF A SAMPLE

(71) Applicant: Netzsch-Gerätebau GmbH, Selb (DE)

(72) Inventor: Alexander Schindler, Leupoldsgrün (DE)

(73) Assignee: NETZSCH-Gerätebau GmbH, Selb (DE)

( * ) Notice: Subject to any disclaimer, the term of this patent is extended or adjusted under 35 U.S.C. 154(b) by 387 days.

(21) Appl. No.: 16/417,931

(22) Filed: May 21, 2019

(65) Prior Publication Data
US 2019/0376916 A1 Dec. 12, 2019

(30) Foreign Application Priority Data

Jun. 6, 2018 (DE) .......................... 102018113412.6

(51) Int. Cl.
*G01N 25/00* (2006.01)
*G01N 25/48* (2006.01)

(52) U.S. Cl.
CPC ......... *G01N 25/482* (2013.01); *G01N 25/486* (2013.01); *G01N 25/4866* (2013.01)

(58) Field of Classification Search
CPC combination set(s) only.
See application file for complete search history.

(56) References Cited

U.S. PATENT DOCUMENTS

| | | | |
|---|---|---|---|
| 3,233,458 A * | 2/1966 | Vrolyk | G01N 25/482 374/30 |
| 3,336,790 A | 8/1967 | Nedumov | |
| 3,732,722 A * | 5/1973 | Norem | G01N 25/486 374/12 |
| 4,306,452 A * | 12/1981 | Ludwig | G01N 25/26 374/1 |
| 4,368,991 A * | 1/1983 | Hentze | G01N 25/4866 374/12 |

(Continued)

FOREIGN PATENT DOCUMENTS

DE 102013102088 B3 7/2014

OTHER PUBLICATIONS

Krisper, Robert "Unsicherheitsbetrachtung an einem dynamischen Differenzkalorimeter zur simultanen thermischen Analyse", published Sep. 1, 2016, XP055644273, 63 pages.

*Primary Examiner* — Lisa M Caputo
*Assistant Examiner* — Nasir U. Ahmed
(74) *Attorney, Agent, or Firm* — Whitmyer IP Group LLC (57) ABSTRACT

A measuring arrangement for a thermal analysis of a sample, having a crucible for storing a sample in the crucible, as well as a sensor for measuring a sample temperature of the sample when the crucible is arranged on the sensor. To reduce the risk of damages to or even the destruction of used components as a result of chemical or physical reactions, it is provided according to the invention that the measuring arrangement further has a washer arrangement, which is inserted between the crucible and the sensor and which has a first layer, which contacts the crucible, of a first material and a second layer, which contacts the sensor, of a second material, which differs from the first material. The invention further includes a method for the thermal analysis of a sample, which is performed by using such a measuring arrangement.

18 Claims, 6 Drawing Sheets

(56) References Cited

U.S. PATENT DOCUMENTS

| | | | | |
|---|---|---|---|---|
| 5,321,719 | A * | 6/1994 | Reed | G01N 5/04 |
| | | | | 374/10 |
| 6,860,632 | B2 * | 3/2005 | Groeschner | G01N 25/486 |
| | | | | 374/12 |
| 8,371,746 | B2 * | 2/2013 | Scharer | G01N 25/486 |
| | | | | 374/10 |
| 2010/0035024 | A1 * | 2/2010 | Datta | H05K 1/0272 |
| | | | | 428/172 |
| 2011/0188534 | A1 * | 8/2011 | Nishimura | G01N 25/4866 |
| | | | | 374/10 |
| 2013/0003225 | A1 * | 1/2013 | Amin | G11B 5/3133 |
| | | | | 360/125.01 |
| 2015/0369765 | A1 * | 12/2015 | Denner | G01N 25/20 |
| | | | | 374/31 |

* cited by examiner

MEASURING ARRANGEMENT AND METHOD FOR A THERMAL ANALYSIS OF A SAMPLE

TECHNICAL FIELD

The present invention relates to a measuring arrangement for a thermal analysis, as well as a method to the thermal analysis according to the claims.

BACKGROUND

Such measuring arrangements and methods for the thermal analysis of a sample realized therewith are known from in various designs the prior art.

The methods, which are of interest here, have in common that at least one sample arranged in a sample chamber is temperature-controlled according to a temperature program, in the course of which a chamber temperature in the interior of the sample chamber is changed, wherein at least one sample temperature of the sample is measured in the course of the temperature program by means of a sensor, which is assigned to the respective sample.

The measuring arrangement, which can be used in the case of such a method for arranging the sample and for measuring the sample temperature and which is to be arranged in the sample chamber for this purpose, has a crucible for storing a sample in the crucible and a sensor for measuring a sample temperature of the sample when the crucible is arranged on the sensor.

In the case of many methods of the thermal analysis, two such measuring arrangements are required in the respective sample chamber, for example for simultaneously temperature-controlling the "actual sample (to be analyzed)" as well as a further sample, typically referred to as "reference" or "reference sample", according to the temperature program in the same sample chamber in the case of the method.

As alternative for such an arrangement of a reference sample in the crucible of the second measuring arrangement, it can also be considered to operate the crucible of the second measuring arrangement "empty" (i.e., without a sample or reference sample, respectively, located therein) in the case of such a method.

Examples for such methods for the thermal analysis involving two measuring arrangements of the mentioned type are, e.g., the differential thermal analysis (DTA) as well as, e.g., the method of the so-called differential scanning calorimetry (DSC) derived therefrom.

Besides the mentioned sensor for measuring the sample temperature, the or each measuring arrangement, respectively, can also have further means for measuring one or a plurality of physical variables in the course of the temperature program. Corresponding methods are often combined under the term simultaneous thermal analysis (STA). An example for this is the determination of the temperature-dependent calorific effects of a sample by means of DSC with simultaneous determination of the temperature-dependent mass of the sample by means of thermogravimetry (TG).

It is problematic in the case of the known measuring arrangements and the methods for the thermal analysis realized therewith that in many applications, in particular when relatively high temperatures occur in the interior of the sample chamber or relatively high sample temperatures resulting therefrom, respectively, in the course of the temperature program, unwanted chemical reactions and/or physical reactions (e.g., diffusion or welding processes) can occur between sample material and crucible material, as well as between crucible and sensor material.

In practice, efforts are thus made for the most part to ensure a corresponding "material compatibility" between sample and crucible material by means of a suitable selection of the crucible material in the case of predetermined sample material (so that the mentioned unwanted reactions occur to a lesser degree or not at all). A metal or a metal alloy, respectively, graphite or ceramic, e.g., is often selected as crucible material. When a reaction between the materials nonetheless occurs thereby, e.g., in the case of high temperatures, this damages the sample and/or the crucible.

However, reactions between crucible and sensor material, which often result in the destruction of the highly valuable sensor, are particularly problematic.

SUMMARY

It is an object of the present invention to reduce the risk of damages to or even the destruction of used components as a result of chemical or physical reactions in the case of a measuring arrangement and a method for the thermal analysis of the above-mentioned type.

According to a first aspect of the invention, this object is solved in the case of a measuring arrangement of the above-mentioned type in that the measuring arrangement further has a washer, which is inserted between the crucible and the sensor and which has a first layer, which contacts the crucible, of a first material and a second layer, which contacts the sensor, of a second material, which differs from the first material.

A "crucible" in terms of the invention consists of or comprises a base body, hereinafter also referred to as crucible body, which has at least approximately the shape of a shell or of a cup. With regard to the situation of use, in the case of which the crucible is arranged on the sensor, the crucible body has a section, which will be referred to as "bottom" hereinafter, which represents a lower end section of the crucible body facing the sensor (in the situation of use), as well as a section, which will be referred to as "jacket" hereinafter, which represents a lateral limitation of the crucible body and which extends in the direction away from the sensor (upwards), starting from the bottom. The bottom and the jacket of the crucible limit an interior of the crucible, in which the sample may be located, stored on the bottom. The crucible can (optionally) be provided with a cover, which closes (completely or partially) an opening of the crucible, which is otherwise located at the top end of the jacket. Such a cover can be embodied, e.g., as separate part and can be attached (detachably or non-detachably) at a top edge of the jacket. In particular crucibles, e.g., the crucible body of which has an at least approximately cylindrical or frustoconical shape, can be used in the context of the invention. The crucible can have, e.g., a maximum lateral expansion in the range of between 3 and 15 mm and/or a height in the range of between 2 and 10 mm, preferably in a lateral expansion/height ratio in the range of between 1.0 and 1.5. A wall thickness of the crucible body can be, e.g., in the range of between 50 and 300 μm.

With regard to the situation of use, the "sensor" comprises a top side, above which the crucible can be stored. As will be described below, this top side can be embodied to be even or uneven and can in particular be made of a metallic material, e.g., at least on the surface. To be able to measure the sample temperature of a sample located in the crucible by means of the sensor, the sensor can in particular have, e.g., below the mentioned surface, e.g., a thermoelement or other means, which are suitable for the temperature measurement. In a special embodiment, the sensor consists of at least two different materials, in particular metallic materials, which are arranged in such a way that a thermoelement for the measurement of the sample temperature is already embodied therewith. In particular a sensor, e.g., which has an at least approximately circular disk-shaped shape, can be used in the context of the invention. The sensor can have, e.g., a maximum lateral expansion in the range of 1.0-times to 1.5-times the maximum lateral expansion of the crucible.

The "washer arrangement", which is inserted between the crucible and the sensor according to the invention, i.e., one or a plurality of washers, makes it possible in an advantageous manner to avoid a direct contact between the crucible and the sensor, so that a reaction between crucible and sensor material is avoided. The first layer, which contacts the crucible, can be made of a first material, which is particularly well compatible with the crucible material, whereas the second layer, which contacts the sensor, can be made of a second material, which is particularly well compatible with the respective sensor material. The washer arrangement is advantageously embodied in such a way that, in the situation of use, the crucible only contacts the first layer and the sensor only contacts the second layer. A height of the washer arrangement can in particular lie, e.g., in a range of between 100 and 500 μm.

All layers adjoining one another within the washer arrangement are preferably made of materials, which are well compatible with one another, so as to otherwise prevent, if possible, chemical and/or physical reactions between these layers, which may possibly take place within the washer arrangement.

It is provided in one embodiment that the washer arrangement has a first washer, which forms the first layer, and, separately therefrom, a second washer, which forms the second layer.

In the case of this embodiment, the two washers can advantageously originate, e.g., from a "washer set", which includes these two or even more washers. The washer arrangement of the measuring arrangement according to the invention thereby preferably consists of the first and the second washer, i.e., without further washer(s) therebetween.

It is provided in a different embodiment that the washer arrangement is a composite washer, which includes the first layer and the second layer so as to be connected to one another (in particular, e.g., non-detachably).

The washer arrangement is thus advantageously assembled so as to already be "ready for use". The composite washer preferably includes only the mentioned first and second layers. It is not to be ruled out, however, that a further layer is included therebetween, the material of which differs from the materials of the first and second layers (e.g., acting as an "adapter layer", on both sides of which the first and second layers can be connected particularly well).

It is provided in one embodiment of the composite washer that the first layer and/or the second layer is a layer, which is produced by means of sputtering. The first layer can be produced, for example, by means of sputtering the second layer or, e.g., the second layer can be produced by means of sputtering the first layer. An "adapter layer" could also be arranged between the first and second layers, wherein the first layer is produced by means of sputtering the adapter layer and/or the second layer is produced by means of sputtering the adapter layer.

It is provided in one embodiment that a lateral expansion of the first layer is smaller than a lateral expansion of the second layer in the washer arrangement.

This embodiment is advantageous in particular, e.g., when the sensor has a sensor edge protruding upwards or a different edge limitation (e.g., as will be described further below). A lateral expansion of the first layer, which is smaller as compared to the second layer, is often advantageous in this case, in order to avoid an unwanted contact between the first layer and the mentioned sensor edge or the edge limitation, respectively.

The lateral expansion of the first layer can thereby be selected to be at least 10%, in particular at least 20%, smaller than the areal lateral expansion of the second layer, e.g., viewed aerially.

In combination with a sensor, which has the mentioned protruding sensor edge or a different edge limitation, the lateral expansion of the second layer can in particular be dimensioned in such a way, e.g., that a centering of the second layer (either a separate second washer or a second layer of a composite washer) is realized on the sensor thereby by means of positive connection.

It is provided in one embodiment that the first layer is embedded on a top side of the second layer in the washer arrangement.

The embedding can be realized, e.g., on a composite washer containing the first layer and the second layer. In the alternative, however, the embedding can also be realized in the case of the embodiment comprising a first washer and a separate second washer, in that the second washer has, on its top side (in the situation of use), a corresponding recess for inserting the first washer. A centering of the first washer on the top side of the second washer can be realized, e.g., by means of positive connection, in this case.

It is provided in one embodiment that the first layer protrudes beyond the second layer towards the top in the washer arrangement.

Similarly as a smaller lateral expansion of the first layer as compared to the second layer, this measure is often also advantageous in order to avoid a contact between the crucible and the second layer and/or in order to avoid a contact between the first layer and the mentioned protruding sensor edge or a different edge limitation.

In the case of an embedding of the first layer on the top side of the second layer, this embodiment is of particular importance. A complete embedding (viewed in the height direction) of the first layer is thus preferably not provided in this case. Instead, it can be provided, e.g., that maximally 70%, e.g., of a vertical expansion of the first layer is overlapped (embedded) by the second layer, so that at least 30% of this vertical expansion protrudes upwards.

It is provided in one embodiment that a top side of the sensor has a sensor edge protruding upwards or a different edge limitation (which is not connected directly to the sensor), whereby a centering of the washer arrangement on the sensor can thereby be realized in a highly advantageous manner by means of positive connection. The sensor edge (or a different edge limitation, respectively), can thereby be embodied so as to extend across the entire circumference of the sensor, e.g., so as to be closed in a ring-shaped manner. In the alternative, the sensor edge (or the edge limitation, respectively) protruding upwards, can, however, also be embodied, e.g., only at individual locations of the circumference, e.g., at three (or more) locations distributed equidistantly across the circumference, viewed across the circumference of the sensor.

It is preferably provided in the case of this embodiment that the second layer of the washer arrangement, viewed in the vertical direction, protrudes beyond the sensor edge or the edge limitation, respectively, towards the top and/or that the lateral expansion of the first layer is smaller than the lateral expansion of the second layer.

In a preferred embodiment of the washer arrangement, the first layer and the second layer of the washer arrangement (and thus generally the entire washer arrangement) each have a circular contour, viewed in top view.

It is provided in one embodiment that the first material or the second material is a metal or a metal alloy, in particular tungsten or a tungsten alloy.

It is provided in one embodiment that the second material or the first material is a ceramic material, in particular a ceramic material on the basis of $Al_2O_3$ or $Y_2O_3$.

With the use of the mentioned materials as the first material and/or second material for most of the applications, a washer arrangement can advantageously be created, which ensures a good material compatibility between crucible and first layer as well as sensor and second layer up to high temperatures.

In one embodiment, the crucible (or at least the bottom thereof, respectively) is made of graphite. In particular in this case, the outer crucible material can advantageously be selected, e.g., as a metal or a metal alloy.

In one embodiment, the respective crucible material is a ceramic material. In particular in this case, the outer crucible material can advantageously be selected, e.g., as a metal or metal alloy.

In one embodiment, the respective crucible material is a metal or a metal alloy. In particular in this case, the outer crucible material can advantageously be selected, e.g., as a ceramic material. In the alternative, graphite, e.g., can also be considered.

In one embodiment, the sensor is made of a metal or a metal alloy (at least in the area contacted by the outer crucible). In particular in this case, the outer crucible material can advantageously be selected, e.g., as a ceramic material.

In one embodiment, the sensor is made of a ceramic material in the relevant area. In particular in this case, the outer crucible material can advantageously be selected, e.g., as a metal or a metal alloy.

According to a further aspect of the invention, the above-given object in the case of a method for the thermal analysis of a sample of the above-mentioned type is solved in that a measuring arrangement of the type described here is used in the sample chamber for arranging the sample and for measuring the sample temperature.

The embodiments and particular designs described here for the measuring arrangement according to the invention can be provided individually or in any combination, analogously also as embodiments or particular designs, respectively, of the method for the thermal analysis according to the invention.

In one embodiment, the method comprises an arranging of a washer arrangement, e.g., in the form of two separate washers or, e.g., in the form of a composite washer, on a sensor arranged in the sample chamber, and an arranging of a crucible, which is provided for the storing of the sample, on the washer arrangement, prior to performing the already mentioned steps.

The "temperature control of the sample" can generally include a heating up and/or cooling down of the sample, wherein temporal phases can furthermore also be provided, in the case of which the temperature program, which forms the basis for the temperature control, provides a constant temperature.

In one embodiment, the temperature program defines the chamber temperature in the interior of the sample chamber, for the purpose of which the method can comprise, e.g., a measuring of the chamber temperature and, based thereon, a control of a temperature control device, preferably by means of a regulation (e.g., PID regulation) of the chamber temperature.

Deviating from this, the temperature program can alternatively also define a predetermined temporal course of the sample temperature, for the purpose of which the corresponding control (in particular regulation) of the temperature control device can take place accordingly, e.g., based on the measured sample temperature.

The method preferably comprises a recording of measuring data in the course of the temperature program, in particular of data, which represents the temperature-dependent and/or time-dependent course of at least one temperature of chamber temperature and sample temperature (and preferably both). By evaluation of such data during the temperature control and/or after conclusion of the temperature program, the at least one property (e.g., material parameter), which is of interest in response to the thermal analysis, of the sample subjected to the method can be determined.

As a function of the thermal analysis, which is to be performed concretely, it can be provided in the case of the method according to the invention that two measuring arrangements of the described type are arranged in the sample chamber, i.e., two sensors of the described type each comprising a crucible of the described type arranged thereon (in each case together with an interpositioned washer arrangement of the described type. In the method, both crucibles or possibly also two samples (e.g., "actual sample" and "reference sample"), respectively, can simultaneously be subjected to a joint temperature control in the sample chamber in this case. As an alternative to the simultaneous temperature control of two samples, the second crucible can also be used, e.g., "empty" (i.e., without sample or reference sample stored therein, respectively), during the method according to the invention.

It goes without saying that in most of the applications, these two measuring arrangements should be embodied identical to each other in the case of such a use of two measuring arrangements of the described type in the case of the method for the thermal analysis.

At least one point in time, the chamber temperature reaches a minimum value in the course of the temperature program and the chamber temperature reaches a maximum value at at least a different point in time.

The use of the invention is particularly advantageous, when relatively high temperatures or a high maximum value, respectively, occurs in the temperature program.

It is provided in one embodiment that the chamber temperature has a maximum value of at least 500° C. in the course of the temperature program.

For many applications, the maximum value can also be at least 750° C. or even at least 1000° C.

On the other hand, it is sufficient for most of the applications to provide a maximum value of the chamber temperature of maximally 2000° C. in the course of the temperature program.

With regard to the minimum value in the course of the temperature program, it can lie, e.g., at "room temperature" or slightly above it (e.g., in the range of between 20° C. and 100° C.), in particular when a temperature control device used in the case of the method does not provide an option for cooling below the room temperature.

Apart from that, a minimum value of the chamber temperature in the range of, e.g., −150° C. to 100° C. can readily be realized for most of the applications (e.g., by means of Peltier cooling and/or, e.g., cooling by means of liquid nitrogen).

In a particularly advantageous embodiment, the method for the thermal analysis is a DSC (differential scanning calorimetry) method, for the purpose of which the described measuring arrangement is present twice in the sample chamber and in particular a time-dependent course of a difference of the temperatures, which are measured by means of the two sensors, is determined in response to the evaluation of a measuring result (e.g., the already mentioned measuring data), in particular so as to thus be able to determine energetic effects and/or, e.g., a temperature-dependent specific heat capacity of the sample.

In a further development, the method for the thermal analysis according to the invention combines a DSC with at least one further thermo-analytical method, such as in particular, e.g., a TGA (thermogravimetric analysis).

In one embodiment, the method for the thermal analysis is a "high temperature" DSC, or a combination of "high temperature" DSC and TGA, wherein the chamber temperature and/or the sample temperature has a maximum value of at least 500° C., in particular at least 750° C., or even at least 1000° C., in the course of the temperature program.

BRIEF DESCRIPTION OF THE DRAWINGS

The invention will be further described below by means of exemplary embodiments with reference to the enclosed drawings. In each case schematically.

DETAILED DESCRIPTION

Figure 1:
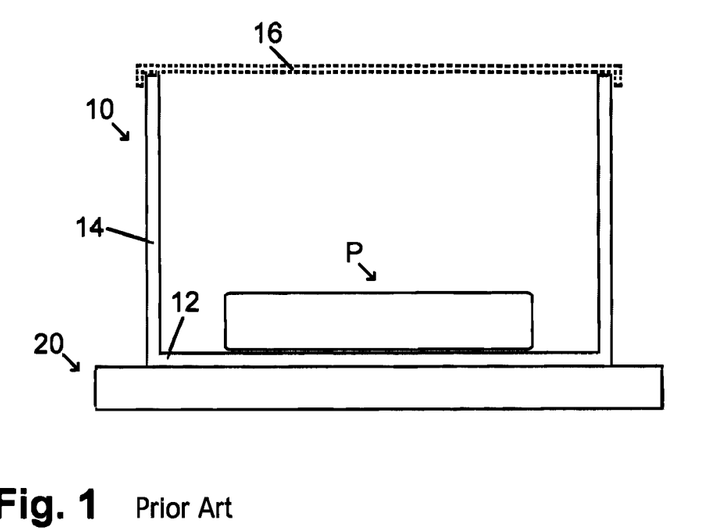
FIG. 1 shows a measuring arrangement for a thermal analysis of a sample, comprising a crucible and a sensor, according to an embodiment of the prior art.

FIG. 1 shows a schematic side view of a measuring arrangement, the setup of which is known from the prior art, for a thermal analysis of a sample P. The measuring arrangement has a crucible 10 for storing the sample P in a crucible 10 as well as a sensor 20 for measuring a sample temperature of the sample P when the crucible 10 is arranged on the sensor 20.

The crucible 10 is made of a crucible material, such as typically, e.g., graphite or metal and has a circular cylindrical form in the illustrated exemplary embodiment comprising a circular disk-shaped bottom 12, to the edge of which a cylindrical jacket 14 protruding upwards is attached.

Terms, such as "top" or "top side", respectively, "bottom" or "bottom side", respectively, "laterally", etc., used here in each case refer to the arrangement of the respective component in the situation of use (in response to performing the thermal analysis).

The crucible 10 can (optionally) further have a cover 16, which is illustrated in a dashed manner in FIG. 1, which closes the interior of the crucible 10, which is otherwise open to the top and is limited by bottom 12 and jacket 14. In some applications, a hole is embodied in such a cover 16 in order to provide for a pressure compensation between the interior including the sample P and an exterior space of the crucible 10.

In the situation of use of the measuring arrangement, the sensor 20 is used in order to be able to arrange a crucible, such as, e.g., the illustrated crucible 10, thereon and to thus arrange the crucible together with sample P, which may be included (including "reference sample") in a sample chamber in a defined manner, and to measure a temperature on the bottom side of the crucible 10 or thus the sample temperature (in the case of the crucible 10 containing the sample P), respectively. The latter requires a more or less low heat transfer resistance emanating from the sample P, further across the bottom 12 of the crucible 10 to the actual temperature measuring device (e.g., thermal element) on the surface or in the interior of the sensor 20.

In the illustrated exemplary embodiment, the sensor 20 has the form of a circular even disk of uniform thickness, so that a good thermal contact between sample P and sensor 20 results in interaction with the bottom 12 of the crucible 10, which is also circular disk-shaped.

Deviating from the illustrated complete abutment of the bottom 12 on the top side of the sensor 20, a different thermal contacting, however, could also be provided, for example along a ring-shaped contact surface between the bottom 12 and the sensor 20, e.g., in that the bottom 12 as a whole or at least on its bottom side is provided with a recess or a curvature.

In the illustrated example, a lateral expansion of the sensor 20, measured as the diameter of the circular disk form, is at least as large as or, as illustrated, even larger than a corresponding lateral expansion of the crucible 10 in the area of the bottom 12 thereof.

All of the features of the crucible 10 and of the sensor 20 described above with regard to the exemplary embodiment of FIG. 1, including respective described modifications, can also be provided in the case of the crucible or the sensor, respectively, of a measuring arrangement according to the present invention. Exemplary embodiments of the present invention will be described further below with reference to FIGS. 7, 8, 9 and 10.

In particular, e.g., the risk of damage or even a destruction of the sensor 20 by means of chemical and/or physical reactions on the contact surface existing between the crucible material and the sensor material is disadvantageous in the case of the known measuring arrangement illustrated in FIG. 1. An analogous problem furthermore results on the contact surface between the sample material and the crucible material.

It is to further be considered to be disadvantageous that there is no well-defined arrangement position of the crucible 10 on the sensor 20 in the case of the measuring arrangement of FIG. 1, viewed in the lateral direction, so that the reproducibility of corresponding measuring processes of the thermal analysis is impacted in response to repeated removal and new rearrangement of the crucible 10 on the sensor 20.

Figure 2:
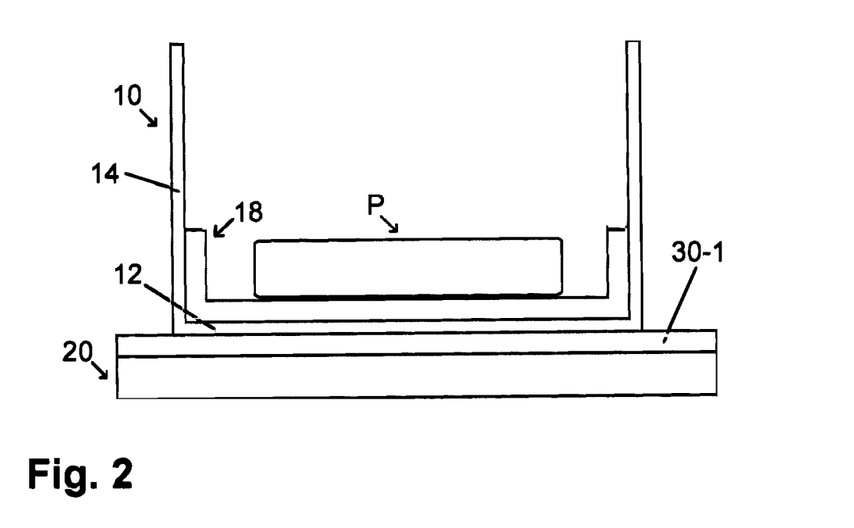
FIG. 2 shows a measuring arrangement similar to that of FIG. 1, but according to a modified exemplary embodiment.
Figure 3:
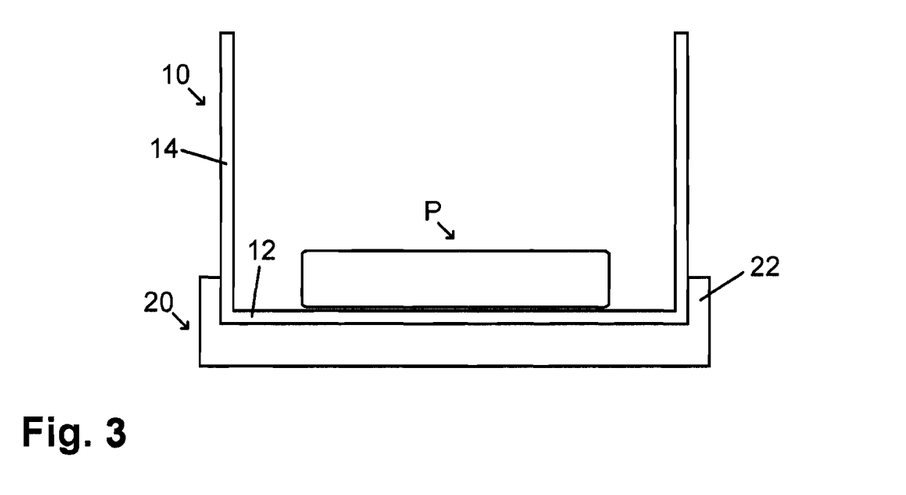
FIG. 3 shows a measuring arrangement similar to that of FIG. 1, but according to a modified exemplary embodiment.
Figure 4:
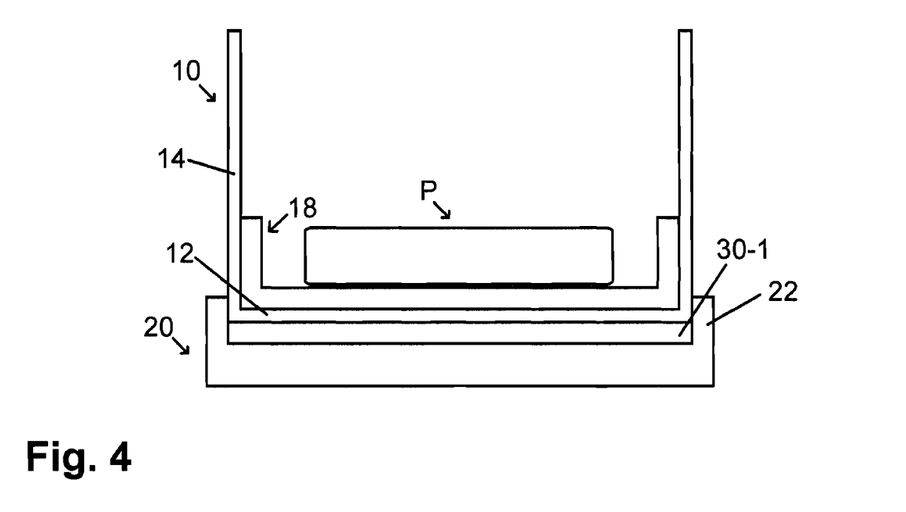
FIG. 4 shows a measuring arrangement similar to that of FIG. 1, but according to a modified exemplary embodiment.

FIGS. 2 to 4 show several exemplary embodiments, which are modified as compared to the example of FIG. 1 and which are based on applicant's internal prior art.

In the following description of the exemplary embodiments according to FIGS. 2 to 4, as well as the further exemplary embodiments according to FIGS. 5 to 12, the same reference numerals are used for components of the respective measuring arrangement, which have the same effect. Essentially only the differences to the already described exemplary embodiment or embodiments, respectively, is discussed thereby and reference is hereby moreover expressly made to the description of the preceding exemplary embodiments.

FIG. 2 shows a measuring arrangement comprising a crucible 10 and a sensor 20, wherein as compared to the example of FIG. 1, however, a first modification lies in that an "inner crucible" 18 is inserted between an e.g., metallic sample P and the, e.g., metallic crucible 10, in order to avoid reactions between the material of the sample P and the material of the crucible 10 at high temperatures. In the illustrated example, the inner crucible 18 is made of a ceramic material.

With regard to the configuration of such an inner crucible, it is preferably adapted to the configuration of the crucible 10, as in the case of the illustrated inner crucible 18, for an abutment (of the outer side of the inner crucible 18 on the inner side of the crucible 10), which is as well-defined as possible and/or as complete as possible. Similar to the crucible 10, the illustrated inner crucible 18 has a circular disk-shaped bottom and a cylindrical jacket attached thereto so as to protrude upwards, wherein the bottom as well as the jacket each abut completely on the respective inner side of the bottom or of the jacket of the crucible 10, respectively, in the illustrated example.

This modification has the advantage, e.g., that a larger freedom is created in response to the selection of the crucible material of the crucible 10.

A second modification lies in that the measuring arrangement further has a washer 30-1, which is inserted between the crucible 10 and the sensor 20 and which has a top side contacting the crucible 10 on the bottom 12 thereof and a bottom side contacting the sensor 20 on the top side thereof.

This modification has the advantage, e.g., that a larger freedom is created thereby in response to the selection of the crucible material and of the sensor material.

In the illustrated example, the washer 30-1 is made of a ceramic material. A diffusion welding and a chemical reaction between the crucible material and the sensor material of the sensor (which is generally very "valuable") is prevented by means of the washer 30-1, which is highly advantageous in particular in situations of use with relatively high temperatures occurring thereby.

The examples according to FIGS. 1 and 2 also have the disadvantage that the crucible 10 is not self-centered with respect to the sensor 20, but that the crucible 10 can shift, e.g., or can be arranged, e.g., in different lateral positions on the sensor 20 by a user, respectively, which has a disadvantageous effect on the reproducibility of measurements performed in the context of the thermal analysis.

To avoid this disadvantage, embodiments can be considered, which are shown in an exemplary manner in FIGS. 3 and 4.

FIG. 3 shows a measuring arrangement, which, as compared to the example of FIG. 1, is modified in that the top side of the sensor 20 has a sensor edge 22, which protrudes upwards, and that a centering of the crucible 10 on the sensor 20 is thus realized by means of positive connection. The sensor edge 22 can be embodied, e.g., extending across the entire circumference of the sensor 20 so as to be closed in a ring-shaped manner.

Deviating from the embodiment according to FIG. 3, the sensor edge 22 protruding upwards could also be embodied only at individual locations of this circumference, viewed across the circumference of the sensor 20.

Deviating from the illustrated example, the positive connection can also be realized by means of a different edge limitation instead of by means of the sensor edge 22, which is to be understood to be a component of the measuring arrangement, which is arranged to be stationary with regard to the sensor 20 in such a way that said measuring arrangement represents a limitation for the crucible 10, viewed in the lateral direction, with regard to the arrangeability thereof on the sensor 20.

FIG. 4 shows a measuring arrangement, in the case of which the top side of a sensor 20 has a sensor edge 22, which protrudes upwards (similar to FIG. 3), so that a centering of the crucible 10 on the sensor 20 is thus realized again by means of positive connection. A washer 30-1 (similar to FIG. 2) is also provided, whereby, compared to the example of FIG. 2, a modification lies in that the washer 30-1 is decreased in the lateral expansion thereof to the extent that it can fit in the space defined by the sensor edge 20.

It is disadvantageous however that, in practice, not all desired sensor-crucible-sample-material combinations can be accomplished with the help of an inner crucible 18 and/or a washer 30-1 with regard to unwanted reactions between sensor and crucible as well as between crucible and sample. For example, some samples have to be arranged in a crucible 10 made of graphite, whereby reactions with the sensor 20 can occur at high temperatures. A ceramic washer 30-1 does not reliably resolve this issue, because it can react with the graphite crucible at high temperatures.

To avoid this problem, embodiments can be provided, which will be described below in an exemplary manner with reference to FIGS. 5, 6, 8, and 10.

Figure 5:
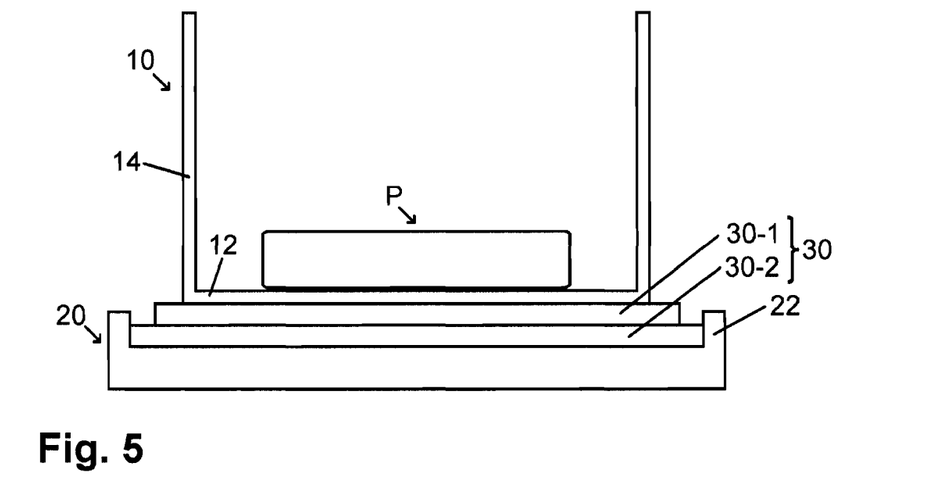
FIG. 5 shows a measuring arrangement according to a further exemplary embodiment (according to the invention)

FIG. 5 shows a measuring arrangement comprising a crucible 10 and a sensor 20, wherein, compared to the example of FIG. 1, it is a special feature that the measuring arrangement further has a washer arrangement 30, which is inserted between the crucible 10 and the sensor 20 and which has a first layer 30-1, which contacts the crucible 10, of a first material, and a second layer 30-2, which contacts the sensor 20, of a second material, which differs from the first material.

The washer arrangement 30 can thereby have a first washer forming the first layer 30-1 and, separately therefrom, a second washer forming the second layer 30-2.

This alternative can also be viewed as modification of the example of FIG. 2, wherein the difference of the embodiment according to FIG. 5 then lies in that a further (second) washer (layer 30-2) is inserted between the crucible 10 and the sensor 20.

In the case of this alternative, it can be provided, in particular in the case of graphite as crucible material, that the first washer or first layer 30-1, respectively, is made of a metallic material (e.g., tungsten or, e.g., tungsten alloy) and the second washer or second layer 30-2, respectively, is made of a ceramic material.

Deviating therefrom, an alternative is also possible in FIG. 5, in the case of which the washer arrangement 30 is a composite washer, which includes the first layer 30-1 and the second layer 30-2 so as to be connected to one another (e.g., welded to one another).

This alternative is well suited, e.g., for the case that the first material and the second material can be welded to one another, thus, e.g., that a suitable combination of two metals or metal alloys, respectively, is selected for this purpose.

The layers of the composite washer, which are connected to one another, can also be embodied in such a way, e.g., that the one layer is embodied as a sputter layer on the other layer.

In the example of FIG. 5, the sensor 20 is furthermore embodied with a sensor edge 22, which protrudes upwards, of the type, which has already been described (with reference to FIGS. 3 and 4), whereby a centering of at least the second layer 30-2 or the washer arrangement 30 as such is centered on the sensor, respectively, when using a composite washer (layers 30-1 and 30-2 connected to one another).

In the example of FIG. 5, the lateral expansion of the first layer 30-1 is furthermore selected to be smaller than the lateral expansion of the second layer 30-2, so as to reliably avoid a contact of the first layer 30-1 to the sensor 20 (on the sensor edge 22) by means of a lateral protrusion of the circumference of the second layer 30-2 all around the circumference of the first layer 30-1.

Figure 6:
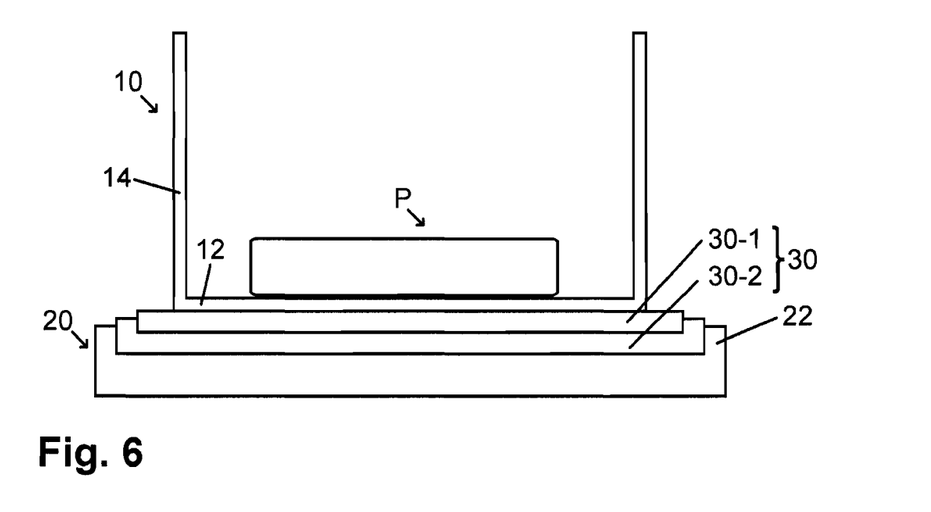
FIG. 6 shows a measuring arrangement according to a further exemplary embodiment (according to the invention)

In order to in particular prevent a shifting or an incorrect positioning, respectively, of the top layer 30-1 even in the case of a separate design of the two layers 30-1 and 30-2, or in order to then also realize a centering of the top layer 30-1, respectively, deviating from FIG. 5, an embodiment, as it is shown in an exemplary manner in FIG. 6, can be used.

FIG. 6 shows a measuring arrangement comprising a crucible 10 and a sensor 20, wherein, as compared to the example of FIG. 5, a modification lies in that the first layer 30-1 in the washer arrangement 30 is embedded on a top side of the second layer 30-2.

It is thereby provided in the example of FIG. 6 that the first layer 30-1 in the washer arrangement 30 protrudes upwards beyond the second layer 30-2. The first washer or layer 30-1, respectively, protrudes upwards slightly beyond the edge of the second washer or layer 30-2, respectively, so that an unwanted contact between the crucible 10 (e.g., of graphite) and the layer 30-2 (e.g., of ceramic material) is ruled out.

In addition to the embodiment with two washers, which are separate from one another, a composite washer, e.g., in the case of which one is formed by first layer 30-1 and second layer 30-2 by means of sputtering or otherwise coating (e.g., the respective other one of these two layers), can in particular be considered with regard to the washer arrangement (with layers 30-1, 30-2) described in FIGS. 5 and 6 (as well as below in the case of FIGS. 8 and 10). For example, the first layer 30-1 can be made of a metallic material (metal or metal alloy) on the top side of a ceramic second layer 30-2 by means of sputtering.

The stacking of two separate washers 30-1, 30-2 has the advantages that each individual washer can also be used alone (or in combination with a different second washer), depending on the application, and that, in the case of a contamination of one of the washers (in particular, e.g., of the washer 30-1), only the latter needs to be exchanged. In the latter case, the contaminated layer would quasi be a useful layer, which can be replaced easily and cost-efficiently.

The described washer arrangement is in particular advantageous in applications, in the case of which the crucible material is graphite and the sensor material is a metallic material. Deviating therefrom, however, a crucible of metallic material (in particular, e.g., tungsten or tungsten alloy), e.g., can also be provided and/or an additional inner crucible (in particular, e.g., of graphite).

Figure 7:
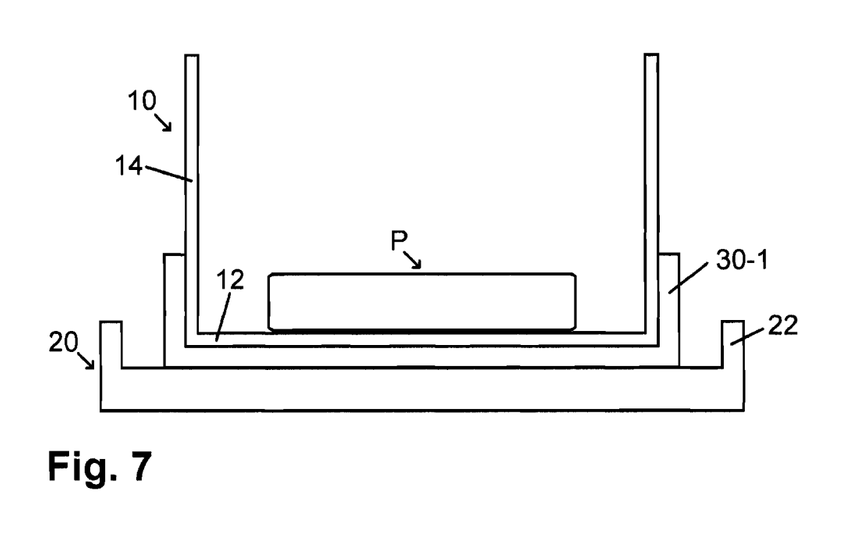
FIG. 7 shows a measuring arrangement according to a further exemplary embodiment.

FIG. 7 shows a measuring arrangement comprising a crucible 10 and a sensor 20, with the special feature that the measuring arrangement further has an "outer crucible" 30-1 for storing the crucible 10 in the outer crucible 30-1, wherein the crucible 10 is made of a crucible material and the outer jacket 30-1 is made of an outer crucible material, which differs from the crucible material.

In contrast to the examples of FIG. 2 and FIG. 4, a modification lies in that said "outer crucible" 30-1 (FIG. 7) is provided instead of an even plate-shaped "washer" 30-1 (FIGS. 2 and 4), in order to avoid a contact between the crucible material and the sensor material.

It is mentioned in this regard that an "outer crucible" in terms of the invention consists of a base body or comprises a base body, also referred to as "outer crucible body" hereinbelow, which has at least approximately the shape of a shell or of a cup, wherein with regard to the intended use (storage of the crucible), the outer crucible body has at least one section, which can be referred to as (outer crucible) "jacket", which represents a lateral limitation of the outer crucible body, and which can optionally have a section, which is to be referred to as (outer crucible) "bottom", which represents a lower end section of the outer crucible body facing the sensor (in the situation of use) and which is connected on the bottom side of the jacket. An interior of the outer crucible, which is limited by the jacket (and the bottom, which may be present), on the inner side of the jacket, is to be dimensioned in such a way thereby that the crucible of the measuring arrangement can be stored therein.

In the case of the exemplary embodiment of FIG. 7, the outer crucible 30-1 has a circular cylindrical shape comprising a circular disk-shaped bottom, to the edge of which a cylindrical jacket is attached so as to protrude upwards.

In the illustrated example, the bottom of the outer crucible 30-1 abuts completely on a bottom 12 of the crucible 10. In the alternative, however, it could also be provided, e.g., that the bottom of the outer crucible 30-1 abuts on the bottom 12 of the crucible 10 along a rings-shaped contact surface.

This can be realized, e.g., in that, deviating from the example according to FIG. 7, the bottom 12 as a whole or at least on its bottom side is provided with a recess or a curvature. In the alternative or in addition, the bottom of the outer crucible 30-1, e.g., could be provided with a corresponding recess or curvature on the top side thereof. It can furthermore be considered, e.g., to provide a material cutout (depression or even a through opening in the bottom) in a central area, viewed laterally, of the bottom of the outer crucible 30-1, so that the crucible 10 now bears on a circular ring-shaped bottom section of the outer crucible 30-1.

It is important to note in this context that the outer crucible, deviating from the example according to FIG. 7, could also be configured completely without a bottom, in particular, e.g., comprising a jacket, which tapers from the top to the bottom in the vertical direction, on the inner side of which the respective crucible bears and is thus stored. It is preferred in the case of this alternative that the respective sensor does not have a largely even top side, as is shown in FIG. 7, but has an (e.g., circular) recess or cutout in a central area, viewed laterally, on the edge of which the outer crucible bears (e.g., extending so as to be closed in a ring-shaped manner). The recess or cutout, respectively, of the sensor can thereby be dimensioned or configured to be so deep, respectively, that no section of the respective crucible contacts the sensor, even if a section of the crucible protrudes downwards beyond a lower end of the outer crucible jacket.

Returning to the example of FIG. 7, it is provided in the case of this example that the jacket of the outer crucible 30-1 abuts completely on the jacket 14 of the crucible 10. In other words, an inner diameter of the jacket of the outer crucible 30-1, in adaptation on an outer diameter of the jacket 14, is dimensioned in such a way here that the crucible 10 can be inserted into the outer crucible 30 with little play, at most.

Such a complete abutment between the jacket of the crucible and the jacket of the outer crucible can (contrary to FIG. 7) also be provided in an advantageous manner, when both jackets taper, e.g., viewed from the top down, for example when both have a frustoconical configuration (with identical angle of inclination).

In the case of such embodiments, a design can advantageously also be provided, which is also realized in the case of the example of FIG. 7 and which lies in that the outer crucible and the crucible are configured in such a way that a centering of the crucible in the outer crucible is realized thereby by means of positive connection. This measure improves the reproducibility of the measurements performed by means of the measuring arrangement.

In the case of the shown example of FIG. 7 it is furthermore provided that the outer crucible 30-1 overlaps approximately 30% of a height of the crucible 10. Such an overlap in the range of 10% to 40% is preferred for the most part.

Under the exemplary assumption that the crucible 10 as well as the sensor 20 are each made of a metallic material, in particular ceramic material, e.g., is suitable as outer crucible material. The outer crucible 30-1 quasi takes over the role of the washer 30-1 shown in FIG. 2 in this case (only that no inner crucible is provided in the case of the example of FIG. 7). The outer crucible (FIG. 7) advantageously also prevents an unwanted contact between the crucible 10 and the sensor 20 on the side of the crucible 10.

Figure 8:
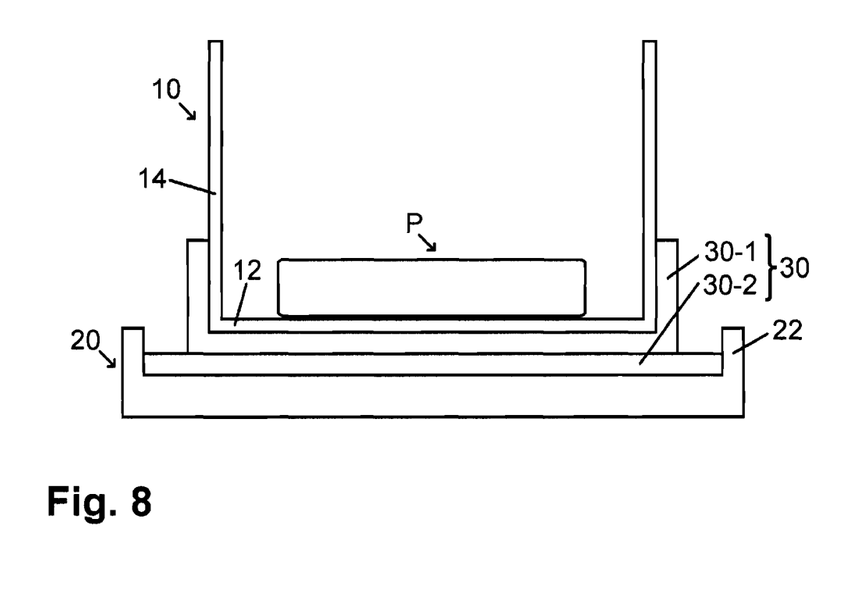
FIG. 8 shows a measuring arrangement according to a further exemplary embodiment (according to the invention)

FIG. 8 shows a measuring arrangement comprising a crucible 10 and a sensor 20, wherein a modification as compared to the example of FIG. 7 lies in that the measuring arrangement further has a washer 30-2, which is inserted between the outer crucible 30-1 and the sensor 20.

As compared to the embodiment according to FIG. 7, in particular the advantage is achieved that a larger freedom is created in response to the selection of the crucible material and/or sensor material by means of this measure.

Figure 10:
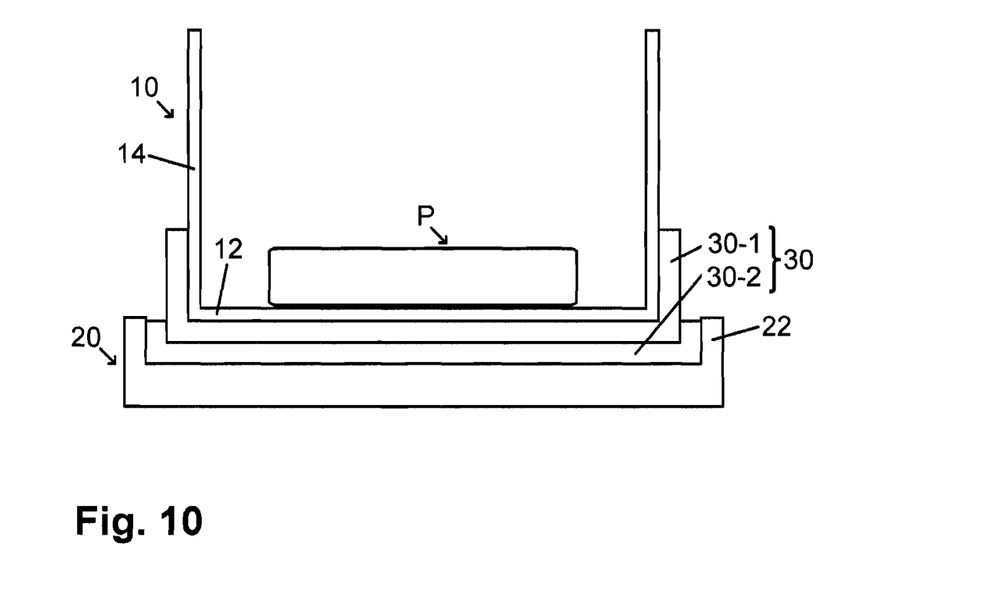
FIG. 10 shows a measuring arrangement according to a further exemplary embodiment (according to the invention)

According to an alternative approach, the example of FIG. 8 can also be considered to be a modification of the already described embodiments comprising "washer arrangement" (see FIGS. 5, 6 and 10). In the case of this approach, the outer crucible 30-1 or at least the bottom thereof, respectively, embodies the "first layer" 30-1 of a washer arrangement 30, and the washer 30-2 embodies a "second layer" 30-2 of the washer arrangement 30.

With regard to this alternative approach, it is further noted that, deviating from the example according to FIG. 8, the two components 30-1, 30-2 could also be provided so as to be connected to one another (e.g., non-detachably). A connection of the components 30-1, 30-2 can thereby be embodied/realized, e.g., in such a way, as it has already been described for a "composite washer".

In the case of the measuring arrangements shown in FIGS. 7 and 8, the crucible 10 is not self-centering with respect to the sensor 20. To realize this, embodiments can be used, which are illustrated in an exemplary manner in FIGS. 9 and 10.

Figure 9:
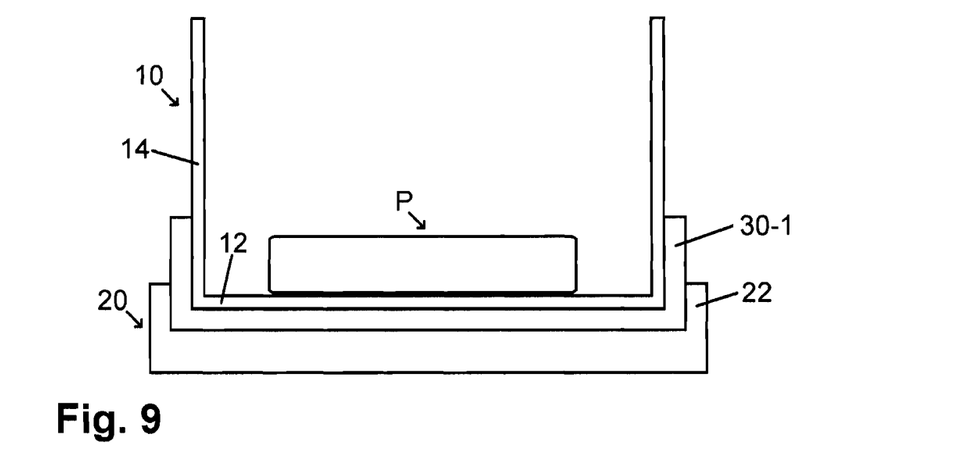
FIG. 9 shows a measuring arrangement according to a further exemplary embodiment.

FIG. 9 shows a measuring arrangement comprising a crucible 10 and a sensor 20, whereas, as compared to the example of FIG. 7, a modification lies in that a centering of an outer crucible 30-1 is realized on the sensor 20 by means of the sensor edge 22 by means of positive connection.

In the case of the example of FIG. 9, the outer crucible 30-1 is centered by means of the direct abutment thereof on the sensor edge 22. In the case of a circular cylindrical configuration of the outer crucible 30-1 and of the sensor edge 22 protruding upwards, as assumed here, this represents a corresponding dimensioning between an outer diameter of the outer crucible 30-1 and an inner diameter of the sensor edge 22.

FIG. 10 shows a measuring arrangement comprising a crucible 10 and a sensor 20, wherein, as compared to the example of FIG. 8, a modification lies in that the washer 30-2 (or the second layer 30-2, respectively, of the washer arrangement 30) is centered on the sensor 20 by means of the sensor edge 22 by means of positive connection. A further modification lies in that an "embedding" (of the type as already described with reference to FIG. 6) of the outer crucible 30-1 (or of the first layer 30-1, respectively) is provided on the top side of the washer 30-2 (or of the second layer 30-2, respectively).

In an alternative approach, the embodiment according to FIG. 10 can also be considered to be a modification as compared to the example of FIG. 6, which consists in that an outer crucible 30-1 (FIG. 10) is provided instead of the first layer 30-1 (FIG. 6), whereby a centering of the crucible 10 is ultimately attained in this example.

In the case of the example of FIG. 10, the outer crucible 30-1, similar as in the case of FIG. 9, is centered on the sensor 20 by means of a positive connection, but not by means of a direct abutment of the outer crucible 30-1 on the sensor edge 22, but indirectly via the visible centering of the washer 30-2 (or second layer 30-2, respectively, of a washer arrangement 30). The washer 30-2 abuts directly on the sensor edge 22.

With regard to the outer crucible material, the latter can be suitably selected in an advantageous manner for a corresponding material compatibility with the material of the respective crucible 10 and the material adjoining downwards, e.g., sensor material or possibly material of a washer 30-2 or second layer 30-2, respectively.

In corresponding applications, the outer crucible material of the outer crucible 30-1 can be, e.g., a metal or a metal alloy, in particular, e.g., tungsten or a tungsten alloy.

In other applications, an outer crucible material of the outer crucible 30-1, e.g., can be more advantageous, which is selected as a ceramic material, for example, on the basis of $Al_2O_3$ or $Y_2O_3$.

In the case of a measuring arrangement according to the invention, the features and embodiment details of the individual components described above with reference to FIGS. 1 to 10 can be arbitrarily combined with one another, insofar as the respective features or embodiments, respectively, are compatible with one another.

The aspect of a centering of the crucible 10, which has already been discussed in the examples according to FIGS. 1 to 10, only requires the lateral positioning of the crucible 10 on the sensor 20. To increase the reproducibility of the measurements performed in the context of the thermal analysis, it would also be advantageous, when the crucible 10 could always be arranged in a predetermined rotational position with regard to the sensor 20 in a simple manner for such measurements. In particular in the case of crucibles, which are embodied at least approximately rotationally symmetrically in known measuring arrangements, it can be assumed in practice that the crucibles are arranged by the user in any or random rotational positions, respectively, with regard to the sensor.

To eliminate this problem, a measuring arrangement, in particular, e.g., a measuring arrangement of the type as already described here with regard to FIGS. 1 to 10, can be embodied with an anti-rotation protection for the crucible, in order to provide a predetermined rotational position of the crucible with regard to the sensor 20 when the crucible 10 is arranged on the sensor 20. Exemplary embodiment examples of such an anti-rotation protection are described with reference to FIGS. 11 and 12.

Figure 11:
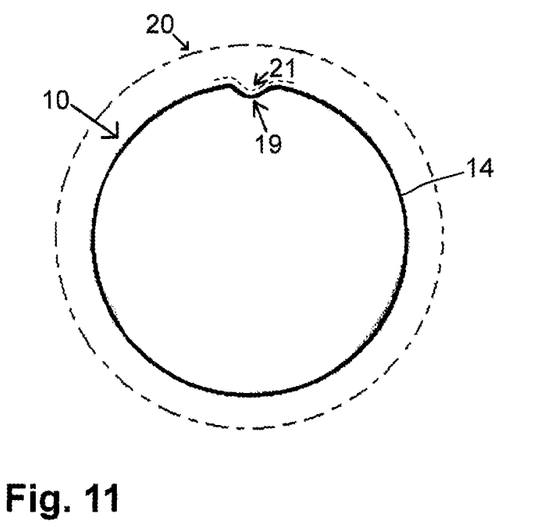
FIG. 11 shows a cross sectional contour of a crucible according to an exemplary embodiment, which can be used in the case of a measuring arrangement.

FIG. 11 shows, in schematic top view, an essentially circular outer contour of a crucible 10, which is arranged on a sensor 20 (illustrated in a dashed manner).

In this exemplary embodiment, a predetermined rotational position of the crucible 10 with respect to the sensor 20 is ensured by means of a positive engagement of a protrusion 21 with a depression 19, wherein the protrusion 21 in FIG. 11 is arranged on the sensor 20 (or a further component of the respective measurement arrangement arranged in a stationary manner to the sensor 20), and the depression 19 is arranged directly on the outer side of a jacket of the crucible 10.

As an alternative to the shown arrangement of the depression 19 directly on the outer side of the crucible jacket, it can also be considered to arrange the depression 19 at a different location in the area of the outer side of the crucible 10, for example on an outer side of a component surrounding the crucible 10, such as, e.g., of an "outer crucible" of the type, as has already been described above.

Under the assumption that the crucible 10 is not separated from a corresponding outer crucible between different measurements in the context of one or a plurality of thermal analyses, an anti-rotation protection provided directly only for the outer crucible is then synonymous with an anti-rotation protection for the crucible 10.

As an alternative to an outer crucible as attachment location for a depression, which ensures the anti-rotation protection, it could furthermore be considered to arrange such a depression on a component, which is provided specifically for this purpose and which surrounds the respective crucible 10 in a sleeve-like manner.

With regard to the arrangement of the protrusion 21 on the sensor 20 (or on a further components, which is arranged in a stationary manner to the sensor 20), it can in particular be provided that the protrusion 21 is arranged directly on the inner side (inner circumference) of the sensor edge, when a "sensor edge" of the type, as has already been described, which protrudes upwards, on the top side of the sensor 20 is present.

Figure 12:
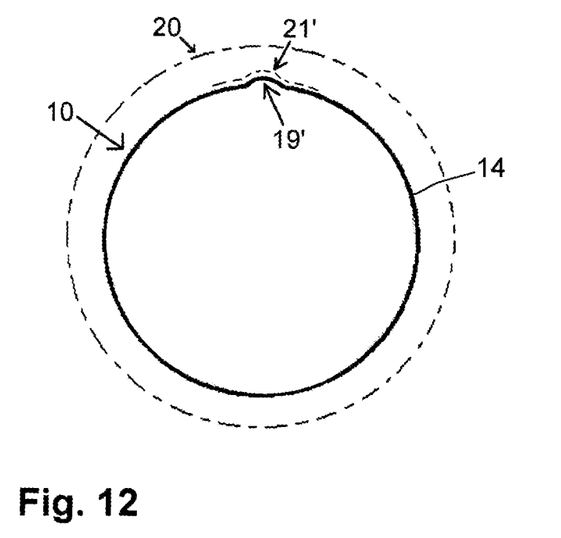
FIG. 12 shows a cross sectional contour similar to that of FIG. 11, but according to a modified exemplary embodiment.

FIG. 12 shows an exemplary embodiment of a crucible 10 on a sensor 20, again, e.g., in a measuring arrangement according to one of FIGS. 1 to 10, wherein a modification as compared to the example of FIG. 11 quasi lies only in that the arrangement locations of the protrusion and of the depression are interchanged. In the case of the example of FIG. 12, a protrusion 19' is thus arranged in the area of the outer side of the crucible 10, and a depression 21' is arranged on the sensor 20 (or a component, which is arranged in a stationary manner thereto), between which the positive engagement ensures the predetermined rotational position of the crucible 10 with regard to the sensor 20.

All of the designs (in particular concrete arrangement locations) described with regard to the depression 19 and the protrusion 21 of FIG. 11, can analogously be used for the design or arrangement, respectively, of the protrusion 19' or of the depression 21', respectively, in the example of FIG. 12.

In the case of the examples of FIGS. 11 and 12, the depression (19 or 21', respectively) and the correspondingly configured protrusion (21 or 19', respectively), have an elongated cross sectional surface, viewed in a plane orthogonally to the direction of the engagement. In this case, the depression can thus in particular form a groove, which runs in a straight line, with which a rib engages, which is dimensioned to fit and which runs in a straight line.

A straight course of the above-mentioned elongated cross sectional surface of the depression (19 or 21', respectively) and, corresponding thereto, of the protrusion (21 or 19', respectively), is preferably oriented in the vertical direction of the measuring arrangement.

It is further preferred, as can also be seen in the examples of FIGS. 11 and 12, when the depression (19 or 21', respectively), and, corresponding thereto, the protrusion (21 or 19', respectively) have a rounded depression bottom or a rounded protrusion end, respectively. In the alternative or in addition, it can be provided, e.g., that a cross section of the depression and, corresponding thereto, a cross section of the protrusion, decrease, viewed in the engagement direction (as can be seen in the examples of FIGS. 11 and 12).

Deviating from the example according to FIGS. 11 and 12, the depression 19 or 21', respectively, and, corresponding thereto, the protrusion 21 or 19', respectively, could in each case also have a non-elongated cross sectional surface, e.g., an at least approximately circular cross sectional surface. For this purpose, the depression and the protrusion could in particular each be configured in an at least approximately frustoconical or approximately hemispherical manner.

In the alternative or in addition to the design described in the example according to FIG. 11 and FIG. 12, with a positive engagement of a protrusion with a depression, the predetermined rotational position of the crucible 10 with respect to the sensor 20 could also be realized in that the crucible 10 has a "marking" (which is visible for a user) in the area of its outer side, in order to make it possible for the user to arrange the crucible 10 on the sensor 20 in the predetermined rotational position of the crucible 10 by means of the marking.

Such a marking can in particular be embodied, e.g., as a marking protrusion or as a marking depression. The crucibles 10 shown in FIGS. 11 and 12 would also be suitably embodied in this respect for such a simplified embodiment of an anti-rotation protection. In the case of these crucibles 10, the depression 19 or the protrusion 19', respectively (also without presence of a corresponding protrusion 21 or a depression 21', respectively), can represent such visible markings.

The designs of the anti-rotation protection described above with regard to FIGS. 11 and 12 can be used in the case of each of the exemplary embodiments of measuring arrangements, which have already been described further above (FIGS. 1 to 10).

The invention claimed is:

1. A measuring arrangement for a thermal analysis of a sample, having:
a crucible for storing a sample in the crucible,
a sensor for measuring a sample temperature of the sample when the crucible is arranged on the sensor, a washer arrangement inserted between the crucible and the sensor, the washer arrangement having a first layer, which contacts the crucible, of a first material and a second layer, which contacts the sensor, of a second material, wherein the second material differs from the first material.

2. The measuring arrangement according to claim 1, wherein the washer arrangement has a first washer forming the first layer and, separately therefrom, a second washer forming the second layer.

3. The measuring arrangement according to claim 2, wherein a lateral expansion of the first layer is smaller than a lateral expansion of the second layer in the washer arrangement.

4. The measuring arrangement according to claim 2, wherein the first layer is embedded on a top side of the second layer in the washer arrangement.

5. The measuring arrangement according to claim 2, wherein the first layer protrudes beyond the second layer towards the top in the washer arrangement.

6. The measuring arrangement according to claim 2, wherein a top side of the sensor has a sensor edge protruding upwards or a different edge limitation and a centering of the washer arrangement on the sensor is thereby realized by means of positive connection.

7. The measuring arrangement according to claim 2, wherein the first material or the second material is a metal or a metal alloy.

8. The measuring arrangement according to claim 2, wherein the second material or the first material is a ceramic material, in particular a ceramic material on the basis of $Al_2O_3$ or $Y_2O_3$.

9. The measuring arrangement according to claim 1, wherein the washer arrangement is a composite washer, which includes the first layer and the second layer so as to be connected to one another.

10. The measuring arrangement according to claim 1, wherein a lateral expansion of the first layer is smaller than a lateral expansion of the second layer in the washer arrangement.

11. The measuring arrangement according to claim 1, wherein the first layer is embedded on a top side of the second layer in the washer arrangement.

12. The measuring arrangement according to claim 1, wherein the first layer protrudes beyond the second layer towards the top in the washer arrangement.

13. The measuring arrangement according to claim 1, wherein a top side of the sensor has a sensor edge protruding upwards or a different edge limitation and a centering of the washer arrangement on the sensor is thereby realized by means of positive connection.

14. The measuring arrangement according to claim 1, wherein the first material or the second material is a metal or a metal alloy.

15. The measuring arrangement according to claim 14, wherein the first material or the second material is tungsten or a tungsten alloy.

16. The measuring arrangement according to claim 1, wherein the second material or the first material is a ceramic material, in particular a ceramic material on the basis of $Al_2O_3$ or $Y_2O_3$.

17. A method for the thermal analysis of a sample, comprising:
temperature-controlling a sample arranged in a sample chamber according to a temperature program, in the course of which a chamber temperature in the interior of the sample chamber is changed,
using a measuring arrangement having:
a crucible for storing a sample in the crucible,
a sensor for measuring a sample temperature of the sample when the crucible is arranged on the sensor,
a washer arrangement inserted between the crucible and the sensor, the washer arrangement having a first layer, which contacts the crucible, of a first material and a second layer, which contacts the sensor, of a second material, wherein the second material differs from the first material; and
measuring a sample temperature of the sample in the course of the temperature program.

18. The method according to claim 17, wherein the chamber temperature has a maximum value of at least 500° C. in the course of the temperature program.

* * * * *